United States Patent
Padgett, Jr.

(10) Patent No.: US 9,227,279 B2
(45) Date of Patent: Jan. 5, 2016

(54) PROTECTIVE DEVICE AND METHOD OF USE FOR A LIFT STATION WATER LEVEL SENSOR

(75) Inventor: Gary C. Padgett, Jr., Mooresville, IN (US)

(73) Assignee: GP Hydraflow, LLC, Mooresville, IN (US)

(*) Notice: Subject to any disclaimer, the term of this patent is extended or adjusted under 35 U.S.C. 154(b) by 770 days.

(21) Appl. No.: 13/488,644

(22) Filed: Jun. 5, 2012

(65) Prior Publication Data
US 2013/0319539 A1 Dec. 5, 2013

(51) Int. Cl.
*B23P 11/00* (2006.01)
*E03F 5/22* (2006.01)
*G05D 9/00* (2006.01)

(52) U.S. Cl.
CPC . *B23P 11/00* (2013.01); *E03F 5/22* (2013.01); *G05D 9/00* (2013.01); *Y10T 137/0402* (2015.04); *Y10T 137/6851* (2015.04); *Y10T 137/7287* (2015.04)

(58) Field of Classification Search
CPC ...... G01F 23/24–23/248; G01F 23/66–23/665
USPC ............... 137/377, 565.37; 73/290 R, 290 V, 73/304 R, 304 C, 305, 319–322
See application file for complete search history.

(56) References Cited

U.S. PATENT DOCUMENTS

| | | | |
|---|---|---|---|
| 1,908,196 A * | 5/1933 | Talbot | 73/322 |
| 2,138,677 A * | 11/1938 | Meyer | 137/560 |
| 3,555,905 A * | 1/1971 | Meyer | 73/321 |
| 3,667,295 A * | 6/1972 | Skutella | 73/290 R |
| 4,025,237 A * | 5/1977 | French | 417/131 |
| 4,348,158 A * | 9/1982 | Wood | 417/40 |
| 4,592,230 A * | 6/1986 | Waring et al. | 73/295 |
| 4,689,991 A * | 9/1987 | Beckley et al. | 73/304 C |
| 4,867,871 A * | 9/1989 | Bowne | 210/97 |
| 4,891,980 A * | 1/1990 | Kawai et al. | 73/290 R |
| 4,928,525 A * | 5/1990 | Aderholt et al. | 73/290 V |
| 5,020,367 A * | 6/1991 | White | 73/319 |
| 5,048,334 A * | 9/1991 | Hampton et al. | 73/290 R |
| 5,435,664 A * | 7/1995 | Pettersson | 405/52 |
| 5,507,178 A * | 4/1996 | Dam | 73/61.49 |
| 5,842,374 A * | 12/1998 | Chang | 73/290 R |

(Continued)

OTHER PUBLICATIONS

Conery Mfg. Series 2900 Mercury Series Float Specifications, Mar. 18, 2004, Conery Mfg., Inc. 1380 Enterprise Parkway, Ashland, Ohio 44805, US.

(Continued)

*Primary Examiner* — John K Fristoe, Jr.
*Assistant Examiner* — Daniel P Donegan
(74) *Attorney, Agent, or Firm* — Taft Stettinius & Hollister LLP; Stephen F. Rost

(57) ABSTRACT

A protective device for a wastewater sensor of a wastewater lift station is characterized by a protector that is sealed against wastewater intrusion at an upper end and open at a tapered lower end, with the protector disposed about at least a portion of a wastewater level sensor assembly. The protector is retained vertically within the lift station such that the bottom opening is proximate a bottom of the lift station. The protector may be incorporated into a wastewater level sensor assembly for a wastewater lift station utilizing, for example, a float-type water level sensor, a multiple discrete electrode-type water level sensor, or a transducer-type water level sensor.

13 Claims, 3 Drawing Sheets

(56) References Cited

U.S. PATENT DOCUMENTS

| | | | |
|---|---|---|---|
| 6,356,071 B1* | 3/2002 | Koski et al. | 324/207.13 |
| 6,644,342 B1* | 11/2003 | Bogan et al. | 137/364 |
| 6,691,570 B1* | 2/2004 | Neuhaus et al. | 73/290 V |
| 6,722,213 B2* | 4/2004 | Offen et al. | 73/863.11 |
| 6,772,782 B2* | 8/2004 | Bogan et al. | 137/15.01 |
| 7,284,422 B1* | 10/2007 | Thompson | 73/170.29 |
| 7,284,427 B2* | 10/2007 | Calabrese | 73/304 R |
| 7,708,060 B2* | 5/2010 | Adam et al. | 166/177.4 |
| 7,963,508 B1* | 6/2011 | McGuffin | 261/77 |
| 7,992,437 B2* | 8/2011 | Tshishiku | 73/431 |
| 8,561,633 B2* | 10/2013 | Early et al. | 137/363 |
| 2002/0189347 A1* | 12/2002 | Caldwell | 73/319 |
| 2005/0150292 A1* | 7/2005 | Yamamoto et al. | 73/304 R |
| 2006/0170543 A1* | 8/2006 | Schaffer et al. | 340/521 |
| 2006/0229575 A1* | 10/2006 | Boiarski | 604/318 |
| 2007/0157724 A1* | 7/2007 | Raffalt | 73/290 R |
| 2007/0234796 A1* | 10/2007 | Tshishiku | 73/290 R |
| 2008/0098809 A1* | 5/2008 | Skinner | 73/290 R |
| 2008/0148844 A1* | 6/2008 | Haberstroh | 73/295 |
| 2010/0162812 A1* | 7/2010 | Parkinson | 73/299 |
| 2010/0199751 A1* | 8/2010 | Lechat | 73/84 |
| 2011/0012592 A1* | 1/2011 | Paradise | 324/207.16 |
| 2012/0096938 A1* | 4/2012 | Edwards | 73/290 R |
| 2013/0068308 A1* | 3/2013 | Padgett, Jr. | 137/1 |
| 2013/0205893 A1* | 8/2013 | Shearer et al. | 73/290 R |
| 2014/0109667 A1* | 4/2014 | White et al. | 73/304 C |

OTHER PUBLICATIONS

Multitrode Probe Specification, www.multitrode.com, Jun. 2012, Multitrode, Inc., Boca Raton, Florida 33487, US.

* cited by examiner

PROTECTIVE DEVICE AND METHOD OF USE FOR A LIFT STATION WATER LEVEL SENSOR

FIELD OF THE INVENTION

The present disclosure relates to water level detection in sewer system lift stations and, more particularly, to a device for protecting water level detectors within a lift station or other liquid storage tank of a sewer system.

BACKGROUND

The importance of efficient sewage systems to modern society is well-known. When such a system is not functioning properly, one does not have to be an expert in civil engineering to notice. Much of a typical sewage system relies on a downward, gravity-driven flow to convey wastewater, which includes sewage; however, because the terrain covered by the system is not completely level, the wastewater sometimes needs to be pumped uphill in order to reach a processing point.

Lift stations are used to effect the conveyance of the wastewater from a lower elevation to higher elevation. Lift stations are particularly useful where an attempt to apply a gravity flow conveyance would result in excessive excavation and construction costs. Moreover, at the lift station, water is separated from the solids in the wastewater. Accordingly, lift stations are a vital component of a sewage system, and a large urban area's system may utilize hundreds of lift stations. It is therefore important for lift stations to function properly.

Lift stations are typically in-ground cylinders, ranging from six to twenty-four feet in diameter and ten to thirty-five feet in depth. Components of a lift station include one or more inlet lines, through which the wastewater enters the lift station: an outlet line, through which the wastewater exits the lift station; one or more submerged pumps to force the flow of the wastewater through the outlet line, and a water sensor that activates one or more pumps. More specifically, the pump(s) activate when the wastewater in the lift station reaches a predetermined level as detected by the water sensor, and then pump the wastewater to the outlet, which is often at a higher elevation than the inlets. Switches turn the pumps off when the wastewater has been pumped below a predetermined level, usually a level just above the pumps—again as detected by the water sensor. Operation of the pump(s) and therefore the lift station depends on the proper functioning of the water sensor. If the water sensor does not or can not properly detect wastewater level, the pump(s) will not properly turn on and off.

Wastewater includes many solids and debris that float on the surface of the wastewater within the lift station. Such solids and debris may include human and animal waste, toilet paper, hair, grease, and other materials. Because the water sensor is situated within the wastewater, and due to the circulation of the wastewater within the lift station, the aforementioned solids and debris tend to accumulate on and wrap around the water sensor. Such accumulation can and does cause water sensor inoperability or at the least, degradation in water sensor performance. Such is a main reason for lift station failure. It is then necessary to rid the solids and/or debris from on and around the water sensor. Because of the nature of a wastewater or sewer system lift station, this is not a particularly pleasant task.

It would therefore be advantageous to have a device for a water level sensor of a wastewater or sewer system lift station that can protect the water level sensor from clogging by solids, grease and/or debris accumulating around the lift station water level sensor.

SUMMARY OF THE INVENTION

The present invention, in one form, is a protective device for a wastewater level sensor of a wastewater lift station and may comprise one or more of the following features and combinations thereof.

An illustrative protective device is characterized by a sleeve, casing, cover, sheath, shield or the like (protector) that is sealed against wastewater intrusion at an upper end and open at a tapered lower end, the protector disposed about at least a portion of a wastewater level sensor assembly. The protector is retained vertically within the lift station such that the bottom opening is proximate a bottom of the lift station.

The present invention, in another form, is a wastewater level sensor assembly for a wastewater lift station and may comprise one or more of the following features and combinations thereof.

An illustrative wastewater level sensor assembly is characterized by a protector that is sealed against wastewater intrusion at an upper end and open at a tapered lower end, and a wastewater level sensor assembly, the protector disposed about at least a portion of a wastewater level sensor assembly.

In one form, the wastewater level sensor assembly may be a float sensor assembly. The float sensor assembly includes a plurality of floats that are pivotally attached at intervals along a cable, string, cord or the like within the sleeve. When wastewater within the sleeve, corresponding to the level of wastewater within the lift station, reaches a float, buoyancy of the float causes the float to pivot—activating an associated switch that in turn, activates one or more lift station pumps. Once the wastewater level within the sleeve lowers, again corresponding to the wastewater level with the lift station, the float pivots back to a non-buoyant state—thereby de-activating the associated switch that in turn, de-activates the one or more lift pumps.

In another form, the wastewater level sensor assembly is a micro-controller based electrical probe assembly having multiple discrete electrodes. When wastewater within the sleeve, corresponding to the level of wastewater within the lift station, reaches a predetermined electrode, conductivity to ground with respect to the particular electrode activates one or more lift station pumps. Once the wastewater level within the sleeve lowers, again corresponding to the wastewater level with the lift station, non-conductivity to ground of the pre-determined electrode de-activates the one or more lift pumps.

In yet another form, the wastewater level sensor assembly is a transducer assembly suspended immediately below the bottom opening of the protector, the transducer assembly utilizing water pressure to determine water level within the lift station. When wastewater within the lift station reaches predetermined levels, corresponding to predetermined pressures, one or more of the lift station pumps are activated. Once the wastewater within the lift station lowers to predetermined levels, corresponding to predetermined pressures, the one or more lift stations pumps are de-activated.

Use of the apparatus disclosed herein allows for an effective method for minimizing, if not eliminating, the need for cleaning and maintenance of a lift station's wastewater level sensor assembly. Although the illustrative embodiments are configured for sewer system lift stations, other embodiments may be applied to any sort of liquid storage tank.

Additional features of the disclosure will become apparent to individuals skilled in the art upon consideration of the following detailed description of the illustrative embodiment.

BRIEF DESCRIPTION OF THE DRAWINGS

The detailed description particularly refers to the accompanying figures in which.

DETAILED DESCRIPTION OF THE ILLUSTRATIVE EMBODIMENTS

Figure 1:
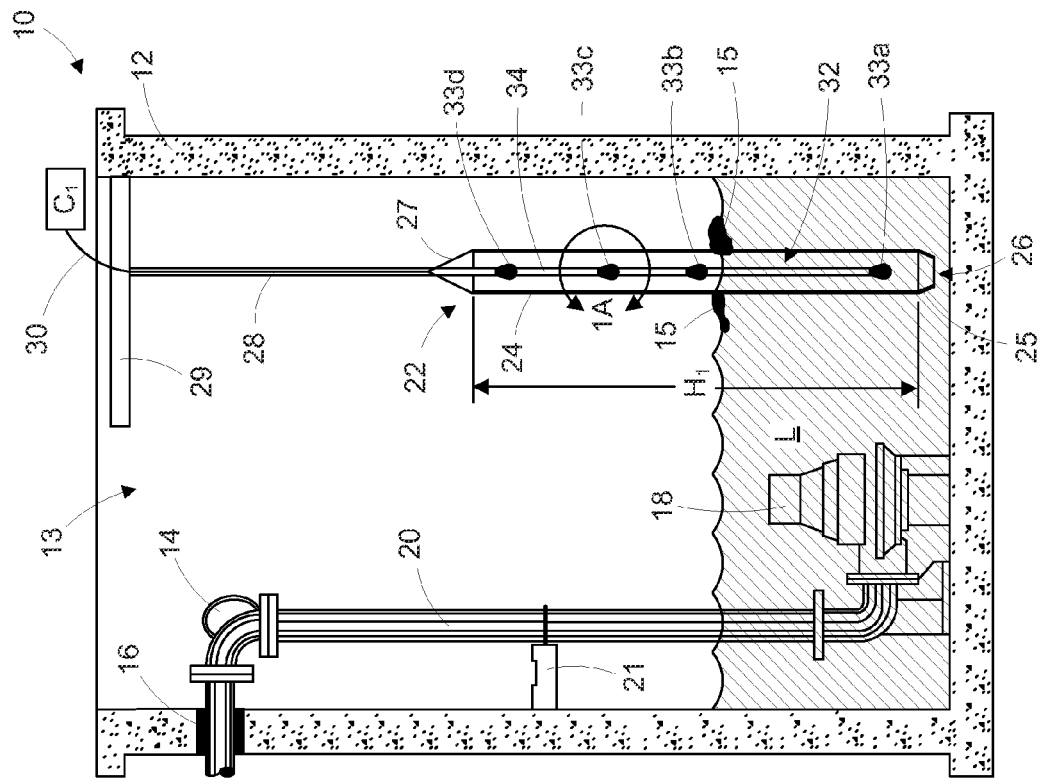
FIG. 1 is a side view of an interior of a lift station having a first illustrative embodiment of a protective device for a water level sensor assembly.

For the purposes of promoting and understanding the principles of the invention, reference will now be made to one or more embodiments illustrated in the drawings and specific language will be used to describe the same.

Referring to FIG. 1, there is depicted a typical lift station 10 in which in disposed an illustrative embodiment of a water lever sensor assembly 22 fashioned in accordance with the principles of the present invention. The lift station 10 has a tank or container 12 typically made of concrete, but may be made of metal, plastic or other suitable material. The tank 12 has an inlet 14 in a wall thereof through which wastewater enters into the tank 12. The tank 12 defines an interior 13 that accumulates the received wastewater L. The wastewater L has solids 15 such as human and animal waste as well as other debris such as toilet paper, hair, grease, and other materials (not shown). A pump 18 is disposed in the interior 13 of the tank 12, it being appreciated that while only one (1) pump is shown, multiple pumps may be utilized if necessary or desired.

The pump 18 is affixed to the base of the tank 12 and thus submerged in the wastewater L. Conduit or piping 20 is connected to the pump 18 and extends through an outlet 16 in a wall of the tank 12. The piping 20 is attached to a stand-off 21 for stabilizing the piping 20. Once introduced into the piping 20 by the pump 18, the wastewater L passes through the piping 20 and is discharged from the tank 12 via the outlet 16. The pump 18 is electrically connected to a lift station controller C1 that turns the pump 18 on or off according to the level of the wastewater L in the tank 12. The level of the wastewater L in the tank 12 is sensed by a wastewater level sensor 32 of a wastewater level sensor assembly 22.

In accordance with the principles of the present invention, the wastewater level sensor assembly 22 includes a protector 24 defined by a sleeve, casing, cover, sheath, shield or the like formed of a non-buoyant (non-floating) material having an outside surface that inhibits or prevents solids and/or debris from adhering to and/or accumulating thereon, such as, but not limited to, PVC. The outside surface of the protector 24 may be naturally slick, smooth or otherwise "non-clogging" or may include a coating or otherwise to provide such a surface. The protector 24 is essentially a tube and particularly, but not necessarily, an elongated tube, defining an interior and having a frusto-conical or tapered crown 27 on an upper or top end thereof and a frusto-conical or tapered base 25 on a lower or bottom end thereof. The crown 27 is open at the top thereof, while the bottom of the protector 24 has an opening 26 to the interior thereof. The crown 27 is tapered in order to deter the accumulation of solids and debris from around the crown 27 and into the opening thereof. The base 25 is tapered to inhibit and/or prevent debris from entering into the interior of the protector 24. The opening 26 allows the inflow of wastewater L into the protector 24 while the open crown 27 allows any air therein to escape.

The protector 24 is vertically retained within the tank 12. As shown, the protector 24 is suspended within the tank 12 via the cable 28 that is attached to a support 29 that projects from a side of the tank 12. It should be appreciated that the protector 24 may be vertically disposed within the tank 12 via other manners such as attachment to the side of the tank 12, attachment to a rail (not shown) of the tank 12, or any other manner such that the function thereof remains the same.

In the embodiment of FIG. 1, the wastewater level sensor 32 is a float sensor assembly such as those manufactured by Conery Mfg. Co. of Ashland, Ohio. The float sensor assembly 32 has a plurality of floats 33a, 33b, 33c, 33d that are each operatively connected to a switch. The floats/switches 33a, 33b, 33c, 33d are attached to a cable 34 that hangs or is suspended within the interior of the protector 24. An electrical line 30 is electrically connected to and extends from the lift station controller C1, through the line 28, into the protector 24, and through the cable 34. The electrical line 34 operatively connects each float/switch 33a, 33b, 33c, 33d to the lift station controller C1. It should be appreciated that the number of floats/switches may differ and typically depends on the number of pumps in the lift station. In the present case, there are four floats/switches 33a, 33b, 33c, 33d. Float 33a operates as a pump off switch. Float 33b operates as a lead pump on switch. Float 33c operates as a lag pump switch. Float 33d operates as a high pump switch.

The floats 33a, 33b, 33c, 33d are spaced from one another to detect different levels of wastewater within the protector 24 which correspond to the levels of wastewater within the tank 12. When the level of the wastewater L reaches the first float/switch 33a (the "off" float), the system registers that there is wastewater in the tank 12. When the wastewater L reaches the second float/switch 33b (the "lead" float), the lead pump (e.g. pump 18) is turned on. Thereafter, if the wastewater level falls below the off float/switch 33a, the lead pump is shut off. If the wastewater L rises above the lead float/switch 33b and reaches the third float/switch 33c (the "lag" float), a lag pump (not shown) turns on. Thereafter, if the wastewater level falls below the off float/switch 33a, the lead and lag pumps are shut off. If the wastewater L rises above the lag float 33c and reaches the fourth float/switch 33d (the "high" float), a high pump (not shown) turns on. Thereafter, if the wastewater level falls below the off float/switch 33a, the lead, lag and high pumps are shut off.

Figure 1A:
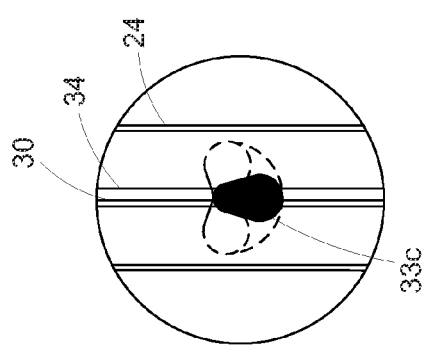
FIG. 1A is an enlarged view of a portion of the water level sensor assembly within the protective device taken along circle 1A particularly illustrating float operation.

Referring to FIG. 1A, the lag float 33c is depicted in greater detail in order to illustrate the manner in which the float operates. The float 33c is pivotally connected to the cable 34 such that the float can swing or pivot to one side or the other as represented by the dashed lines. When the float 33c pivots upwardly, a switch (not shown) connected to the float 33c turns on sending a signal via electrical line 30 to the lift station controller C1. When the float 33c returns to its non-floating state, the switch turns off. The protector 24 has an inner diameter that is sufficient to allow the floats to pivot unrestricted for proper operation.

For the embodiment of FIG. 1, the protector 24 has a length H1 that is sufficient to enclose the entire sensor/float assembly 32. In this case, such length is approximately six feet (6')
to ten feet (10'). It should be appreciated, however, that the
protector 24 may enclose only a portion of a sensor assembly
depending on the type of sensor assembly such as is the case
with the embodiment depicted in FIG. 3. The protector 24 is
preferably, but not necessarily, situated within the tank 12
such that the bottom opening 26 is proximate the bottom of
the tank. This allows the sensor assembly 32 to determine
appropriately when the wastewater L within the tank 12 needs
pumping. As shown with respect to the solids 15, the protector
24 inhibits and/or prevents solids, debris and the like from
wrapping around, collecting onto, and/or clogging the wastewater sensor 32, while allowing the wastewater level in within
the protector 24 to be the same as the wastewater level outside
the protector 24 (i.e. within the tank 12).

Figure 2:
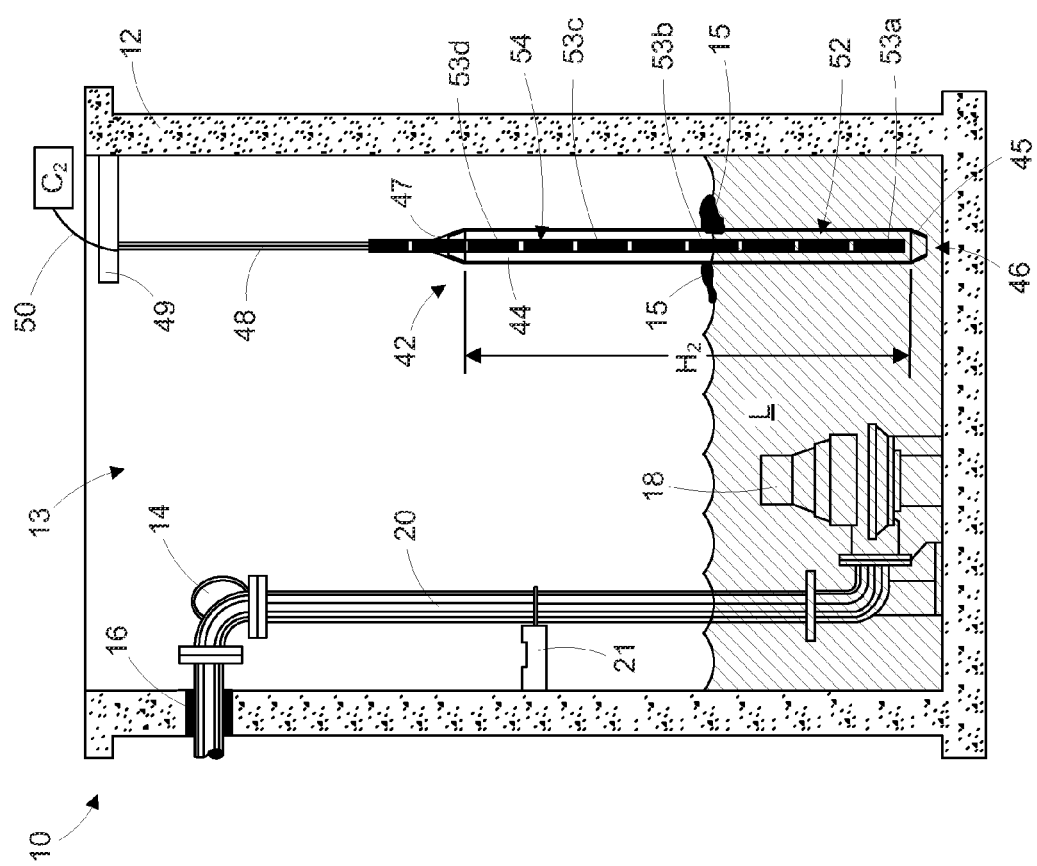
FIG. 2 is a side view of the interior of the lift station having a second illustrative embodiment of a protective device for a water level sensor assembly.

Referring now to FIG. 2, another embodiment of the
present invention is shown wherein a wastewater level sensor
assembly 42 is shown, again characterized by wastewater
level sensor 52 and a protector 44 defined by a sleeve, casing,
cover, sheath, shield or the like formed of a non-buoyant
(non-floating) material having an outside surface that inhibits
or prevents solids and/or debris from adhering to and/or accumulating thereon, such as, but not limited to, PVC. The outside surface of the protector 44 may be naturally slick, smooth
or otherwise "non-clogging" or may include a coating or
otherwise to provide such a surface. The protector 44 is essentially a tube and particularly, but not necessarily, an elongated
tube, defining an interior and having a frusto-conical or
tapered crown 47 on an upper or top end thereof and a frusto-conical or tapered base 45 on a lower or bottom end thereof.
The crown 47 is open at the top thereof while the bottom of the
protector 44 has an opening 46 to the interior thereof. The
crown 47 is tapered in order to deter the accumulation of
solids and debris from around the crown 47 and into the
opening thereof. The base 45 is tapered to inhibit and/or
prevent debris from entering into the interior of the protector
44. The opening 46 allows the inflow of wastewater L into the
protector 44 while the open crown 47 allows any air therein to
escape.

The protector 44 is vertically retained within the tank 12.
As shown, the protector 44 is suspended within the tank 12 via
a cable 48 that is attached to a support 49 that projects from a
side of the tank 12. It should be appreciated that the protector
44 may be vertically disposed within the tank 12 via other
manners such as attachment to the side of the tank 12, attachment to a rail (not shown) of the tank 12, or any other manner
such that the function thereof remains the same.

In the embodiment of FIG. 2, the wastewater level sensor
52 is a multiple discrete electrode water level sensor/sensor
assembly known by the registered trademark Multitrode®
manufactured by Multitrode, Inc. of Boca Raton, Fla. The
multiple discrete electrode sensor assembly 52 has a plurality
(multiple) electrodes 53 assembled in a stack 54 each electrode of which may be used to detect wastewater level at the
level of the particular electrode. The stack 54 is attached to the
line 48 that suspends the protector 44 and the stack 54 in the
tank 12.

An electrical line 50 is electrically connected to and
extends from a lift station controller C2, through the cable 48
and is electrically coupled to the sensor assembly 52 in order
to operatively connect each electrode 53 to the lift station
controller C2. While each electrode of the sensor assembly 52
may be used to detect wastewater level at the particular level
of the electrode, and thus provide a signal to the lift station
controller C2 to turn a pump on or off, in the present illustrations, four electrodes 53a, 53b, 53c, 53d are used. Electrode
53a operates as a pump off switch. Electrode 53b operates as
a lead pump on switch. Electrode 53c operates as a lag pump
switch. Electrode 53d operates as a high pump switch. The
electrodes, in conjunction with the lift station controller C2,
measure resistance relative to ground in order to detect water
level.

The electrodes 53a, 53b, 53c, 53d are spaced from one
another to detect different levels of wastewater within the
protector 44 which correspond to the levels of wastewater
within the tank 12. When the level of the wastewater L reaches
the first electrode 53a (the "off" electrode), the system registers that there is wastewater in the tank 12. When the wastewater L reaches the second electrode 53b (the "lead" electrode), the lead pump (e.g. pump 18) is turned on. Thereafter,
if the wastewater level falls below the off electrode 53a, the
lead pump is shut off. If the wastewater L rises above the lead
electrode 53b and reaches the third electrode 53c (the "lag"
electrode), a lag pump (not shown) turns on. Thereafter, if the
wastewater level falls below the off electrode 53a, the lead
and lag pumps are shut off. If the wastewater L rises above the
lag electrode 53c and reaches the fourth electrode 53d (the
"high" electrode), a high pump (not shown) turns on. Thereafter, if the wastewater level falls below the off electrode 53a,
the lead, lag and high pumps are shut off.

For the embodiment of FIG. 2, the protector 44 has a length
H2 that is sufficient to enclose the entire sensor assembly 52.
In this case, such length is approximately six feet (6') to ten
feet (10'). Again, it should be appreciated, however, that the
protector 44 may enclose only a portion of a sensor assembly
depending on the type of sensor assembly such as is the case
with the embodiment depicted in FIG. 3. The protector 44 is
preferably, but not necessarily, situated within the tank 12
such that the bottom opening 46 is proximate the bottom of
the tank. This allows the sensor assembly 42 to determine
appropriately when the wastewater L within the tank 12 needs
pumping. As shown with respect to the solids 15, the protector
44 inhibits and/or prevents solids, debris and the like from
wrapping around, collecting onto, and/or clogging the wastewater sensor 52, while allowing the wastewater level in within
the protector 44 to be the same as the wastewater level outside
the protector 44 (i.e. within the tank 12).

Figure 3:
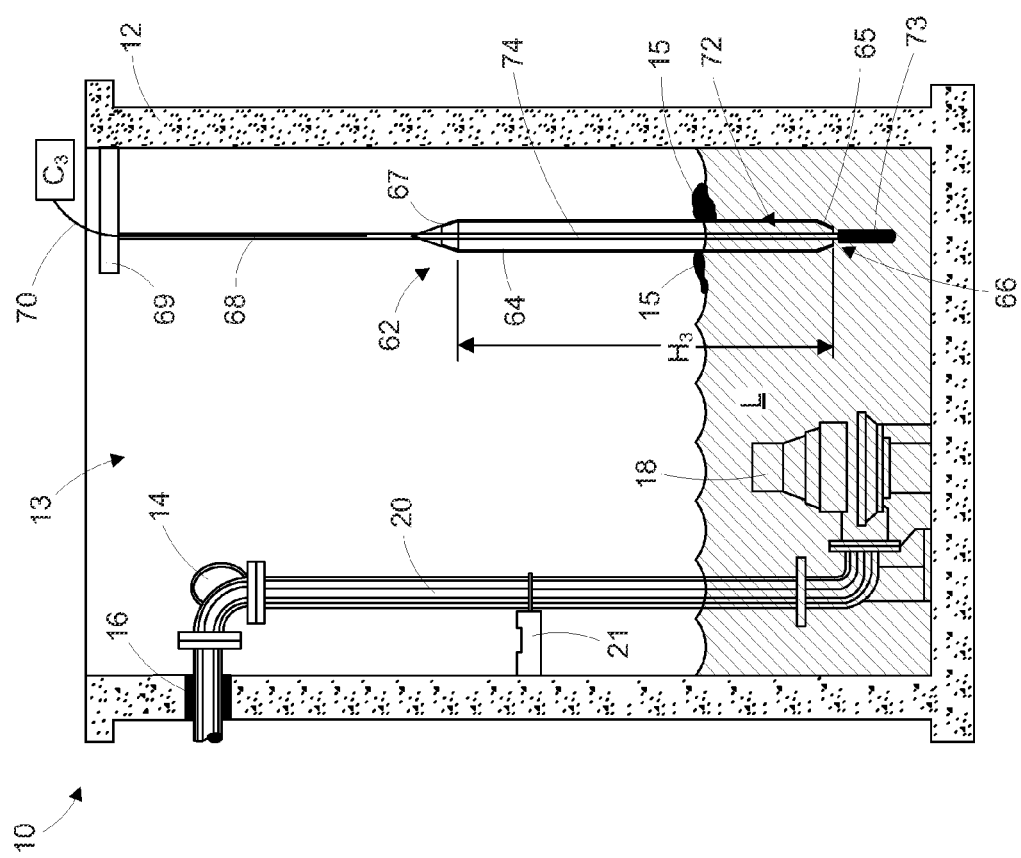
FIG. 3 is a side view of the interior of the lift station having a third illustrative embodiment of a protective device for a water level sensor assembly.

Referring now to FIG. 3, a further embodiment of the
present invention is shown. In this embodiment, a wastewater
level sensor assembly 62 is shown, again characterized by
wastewater level sensor 72 and a protector 64 defined by a
sleeve, casing, cover, sheath, shield or the like formed of a
non-buoyant (non-floating) material having an outside surface that inhibits or prevents solids and/or debris from adhering to and/or accumulating thereon, such as, but not limited
to, PVC. The outside surface of the protector 64 may be
naturally slick, smooth or otherwise "non-clogging" or may
include a coating or otherwise to provide such a surface. The
protector 64 is essentially a tube and particularly, but not
necessarily, an elongated tube, defining an interior and having
a frusto-conical or tapered crown 67 on an upper or top end
thereof and a frusto-conical or tapered base 65 on a lower or
bottom end thereof. The crown 67 is open at the top thereof,
while the bottom of the protector 64 has an opening 66 to the
interior thereof. The crown 67 is tapered in order to deter the
accumulation of solids and debris from around the crown 67
and into the opening thereof. The base 65 is tapered to inhibit
and/or prevent debris from entering into the interior of the
protector 64. The opening 66 allows the inflow of wastewater
L into the protector 64 while the open crown 67 allows any air
therein to escape.

The protector 64 is vertically retained within the tank 12.
As shown, the protector 64 is suspended within the tank 12 via
the cable 68 that is attached to a support 69 that projects from a side of the tank 12. It should be appreciated that the protector 64 may be vertically disposed within the tank 12 via other manners such as attachment to the side of the tank 12, attachment to a rail (not shown) of the tank 12, or any other manner such that the function thereof remains the same.

In the embodiment of FIG. 3, the wastewater level sensor 62 is a transducer water level sensor/sensor assembly such as the A1000i Submersible Level Transducer/Transmitter manufacture by Siemens AG. The transducer sensor assembly 62 has a transducer 73 that is used to detect wastewater level via off pressure. The transducer 73 is attached to a cable 74 which in turn is connected to the cable 68 that suspends the protector 64 and the transducer assembly 72 within the tank 12.

An electrical line 70 is electrically connected to and extends from a lift station controller C3, through the cable 74 and is electrically coupled to the transducer 73 in order to operatively connect the transducer 73 to the lift station controller C3. Pressure levels on the transducer 73 detects wastewater level, and thus provides a signal to the lift station controller C3 to turn one or more pump on or off.

When the level of the wastewater L reaches a first pressure, corresponding to a first wastewater level, the system registers that there is wastewater in the tank 12. When the wastewater L reaches a second pressure (a "lead" pressure), corresponding to a second wastewater level), the lead pump (e.g. pump 18) is turned on. Thereafter, if the wastewater pressure falls below the off pressure, the lead pump is shut off. If the wastewater L reaches a third pressure (a "lag" pressure), corresponding to a third wastewater level, a lag pump (not shown) turns on. Thereafter, if the wastewater pressure falls below the off pressure, the lead and lag pumps are shut off. If the wastewater L reaches a fourth pressure (a "high" pressure), corresponding to a fourth wastewater level, a high pump (not shown) turns on. Thereafter, if the wastewater level falls below the off pressure, the lead, lag and high pumps are shut off.

For the embodiment of FIG. 3, the protector 44 has a length H3 that is sufficient to either partially enclose the transducer 73 (not shown) or enclose only the support cable 64 (shown) for the transducer. In this case, such length is approximately six feet (6') to eight feet (8'). The protector 64 is preferably, but not necessarily, situated within the tank 12 such that the bottom opening 66 is proximate the bottom of the tank. This allows the transducer 73 determine appropriately when the wastewater L within the tank 12 needs pumping. As shown with respect to the solids 15, the protector 64 inhibits and/or prevents solids, debris and the like from wrapping around, collecting onto, and/or clogging the wastewater sensor cable 64.

It should be appreciated that other types of wastewater level sensors may be used other than those shown and described. Moreover, the shape of the protector may be different than the tubular protectors that are shown—as long as the interior thereof is sufficient to accommodate a water level sensor and/or water level cable and allow the water level within the interior to correspond to the water level within the lift station (in the case where the water sensor is within the protector interior).

A method for using the protective device or protector as described above for a water level sensor of a lift station includes: providing a protector as described above; disposing the protector about at least a portion of a water level sensor of a lift station; and disposing the protector vertically within the lift station with a bottom of the protector proximate a bottom of the lift station.

While the invention has been illustrated and described in detail in the foregoing drawings and description, the same is to be considered as illustrative and not restrictive in character, it being understood that only illustrative embodiments thereof have been shown and described and that all changes and modifications which are within the scope of the claimed subject matter are desired to be protected.

What is claimed is:

1. A lift station, comprising:
   a tank including an outer wall that defines a reservoir for holding wastewater, the outer wall further defining an inlet and an outlet;
   a pump mounted to the base of the tank and submerged below the wastewater, where the pump is coupled to the outlet;
   a controller electrically coupled to the pump, the controller operatively coupled to the pump to control a level of wastewater in the reservoir of the tank;
   a sensor coupled to the tank, comprising:
      an outer, non-buoyant cover having an outer surface, a top end, a bottom end, and an interior defined between the outer surface, top end and bottom end;
      a cable coupled to and suspended from the top end of the cover, the cable forming an outer sleeve;
      an electrical line disposed within the outer sleeve of the cable, the electrical line electrically, coupled to the controller; and
      a plurality of sensors coupled to the cable and electrically coupled to the electrical line, wherein the plurality of sensors is spaced from one another along a length of the cable and within the interior of the cover;
   wherein, the top end of the cover is tapered and defines a first opening, and the bottom end is tapered and defines a second opening;
   further wherein, when positioned within the lift station, the bottom end is submerged below the level of wastewater and the top end is disposed above the wastewater level so that wastewater flows into the interior of the cover through the second opening and into direct contact with at least one of the plurality of sensors;
   further wherein the pump comprises a first pump, a second pump, and a third pump;
   further wherein:
      the first pump is controllably enabled when the level of wastewater in the tank rises above a first of the plurality of sensors, and the first pump is controllably disabled when the level of wastewater falls below the first of the plurality of sensors;
      the second pump is controllably operated when the level of wastewater in the tank rises above a second of the plurality of sensors, and the second pump is controllably disabled when the level of wastewater falls below the first of the plurality of sensors;
      the third pump is controllably operated when the level of wastewater in the tank rises above a third of the plurality of sensors, and the third pump is controllably disabled when the level of wastewater falls below the first of the plurality of sensors;
      further wherein, the first sensor is positioned below the second sensor, and the second sensor is positioned below the third sensor.

2. The lift station of claim 1, wherein the cover is made from PVC material.

3. The lift station of claim 1, wherein the sensor is suspended via a second cable vertically within the reservoir of the tank.

4. The lift station of claim 1, wherein the sensor is mounted vertically to the outer wall of the tank.

5. The lift station of claim 1, wherein the cover comprises an elongated tube.

6. A lift station, comprising:
- a tank including an outer wall that defines a reservoir for holding wastewater, the outer wall further defining an inlet and an outlet;
- a first pump, a second pump, and a third pump mounted to the base of the tank and submerged below the wastewater, where each of the first pump, the second pump, and the third pump is coupled to the outlet;
- a controller electrically coupled to each pump, the controller operatively coupled to each pump to control a level of wastewater in the reservoir of the tank;
- a sensor assembly coupled to the tank, comprising:
  - an outer, non-buoyant cover having an outer surface, a top end, a bottom end, and an interior defined between the outer surface, top end and bottom end;
  - a cable coupled to and suspended from the top end of the cover, the cable forming an outer sleeve;
  - an electrical line disposed within the outer sleeve of the cable, the electrical line electrically coupled to the controller; and
  - a plurality of sensors coupled to the cable and electrically coupled to the electrical line, wherein the plurality of sensors is spaced from one another along a length of the cable and within the interior of the cover;
- wherein:
  - the first pump is controllably enabled when the level of wastewater in the tank rises above a first of the plurality of sensors, and the first pump is controllably disabled when the level of wastewater falls below the first of the plurality of sensors;
  - the second pump is controllably operated when the level of wastewater in the tank rises above a second of the plurality of sensors, and the second pump is controllably disabled when the level of wastewater falls below the first of the plurality of sensors;
  - the third pump is controllably operated when the level of wastewater in the tank rises above a third of the plurality of sensors, and the third pump is controllably disabled when the level of wastewater falls below the first of the plurality of sensors;
  - further wherein, the first sensor is positioned below the second sensor, and the second sensor is positioned below the third sensor.

7. The lift station of claim 6, wherein the top end of the cover is tapered and defines a first opening, and the bottom end is tapered and defines a second opening.

8. The lift station of claim 7, wherein the bottom end is submerged below the level of wastewater and the top end is disposed above the wastewater level so that wastewater flows into the interior of the cover through the second opening and into direct contact with at least one of the plurality of sensors.

9. The lift station of claim 6, wherein the cover is made from PVC material.

10. The lift station of claim 6, wherein the sensor assembly is suspended via a second cable vertically within the reservoir of the tank.

11. The lift station of claim 10, further comprising a support arm mounted to a top portion of the tank, the second cable coupled to the support arm so that the cable is suspended into the reservoir from the support arm.

12. The lift station of claim 6, wherein the sensor assembly is mounted vertically to the outer wall of the tank.

13. The lift station of claim 6, wherein the cover comprises an elongated tube.

* * * * *